United States Patent Office 3,355,568
Patented Nov. 28, 1967

3,355,568
ELECTRON-BEAM MACHINING OF SPECIMENS AND ITS CONTROL BY X-RAY RADIATION MEASUREMENTS
Tadamasa Hirai, Shinjuku-ku, Tokyo-to, Hiroshi Ueda, Suginami-ku, Tokyo-to, and Chusuke Munakata and Hiroshi Watanabe, Kitatama-gun, Tokyo-to, Japan, assignors to Kabushiki Kaisha Hitachi Seisakusho, Tokyo-to, Japan, a joint-stock company of Japan
Filed July 23, 1963, Ser. No. 297,125
Claims priority, application Japan, July 28, 1962, 37/31,969
4 Claims. (Cl. 219—69)

ABSTRACT OF THE DISCLOSURE

A method of electron beam machining of specimens, such as semiconductors, while determining the characteristic X-ray radiated by the portion of the specimen which is machined. Greater accuracy of machining thereby is assured than hitherto feasible.

---

Hitherto, the so-called etching method has conventionally been utilized for locally cutting very thin layers such as, for example, a diffused layer or epitaxial layer on the surface of a semiconductor. However, according to said conventional method, it is very difficult to obtain a definite depth, because the depth of cutting depends upon the etching time which is presumed from the predetermined etching conditions. Furthermore, when mechanical cutting of any fine part, for example, partial cutting of an electrode adhering to the end surfaces of several thermoelectric materials which are arranged in the order of pnpn . . . is to be carried out, various disadvantages arise so that a very subtle cutting machine is necessary. Moreover, natural limits in the cutting range exist, mechanical strains are likely to occur in the element and electrode materials to be worked, and, during machining of the specimen, it is necessary to stop the machining operation intermittently and take out the specimen so as to carry out X-ray analysis by conducting a process such as lapping.

Furthermore, it previously has been relatively difficult, in the case of producing an alloy by melting different metals of two or more kinds, to attain a correct determination of the compositional ratio of said metals.

It is an object of the invention to provide a novel method of accurately controlling the electron beam machining operation.

It is another object of the invention to provide a method of controlling the machining operation while determining the characteristic X-ray radiated from the portion which is machined.

A further object of the invention is a novel method of indicating the constituents of the specimen being machined.

The invention is applicable to machining of a specimen from its surface by means of an electron-beam to obtain a final product having desired shape, dimension, and depth; for example, to reduce the thickness of the specimen or to machine a bore, groove or cavity in said specimen. It relates to a method of introducing characteristic X-rays radiated from the specimen to be machined into an X-ray spectroscope so as to detect the progress in machining as well as to determine the composition of the specimen. This invention enables, if necessary, stopping of the machining operation with an electron-beam for a while so as to carry out an analysis. In the same manner as described above, when an X-ray spectroscope is provided near the molten metals which have been melted by the electron-beam, measurement of the ratio of the constituent metals at the time of melting, is feasible, so that an alloy of given composition can be produced while melting said metals.

According to the method of this invention, the mask which has conventionally been used in the case of partial machining becomes unnecessary, because the machining operation utilizes an electron-beam capable of being directed to the desired part. Hence, subtle machining of only the desired layer is made possible, owing to the fact that machining is carried out while surveying the characteristics of the layer to be machined, whereby preciseness of three-dimensional machining can easily be obtained, and surveillance of the surface of the specimen as well as of the internal constituents of the specimen becomes possible. Although the method of this invention corresponds to destructive testing, the distribution of three-dimensional constituents (for example, distribution of the impurities within the element) of the specimen can be ascertained.

The details of the invention as well as the manner in which the foregoing object and other objects may best be achieved will be more clearly apparent by reference to the following description of a representative embodiment of the invention when taken in conjunction with the accompanying drawing, in which FIG. 1 is a side view of one embodiment of this invention;

Figure 1:
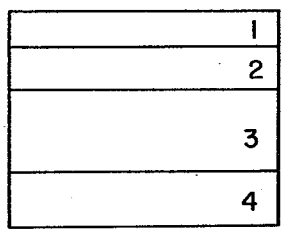
Figure 2:
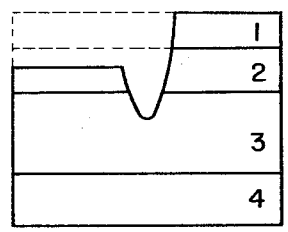
FIG. 2 is a side view of the embodiment shown in FIG. 1 after its broken line portion has been cut away.

In FIG. 1 a semiconductor element is shown such as silicon which has been manufactured in accordance with a conventional method, for example, by means of an epitaxial method. The first and third layers of this semiconductor element are of n-type conductivity, doped with As, and the second and fourth layers are of p-type conductivity, doped with Al. The semiconductor element is then machined in such a manner that, as shown in FIG. 2, the first n-type conductivity layer is half removed from the uniform pn junction part by electron-beam machining as shown by dotted lines and then p-type layer is cut. In this case, since a characteristic X-ray of each of the metals As and Al is radiated, the part being machined can be easily ascertained by determining the wavelength of said characteristic X-ray.

Figure 3:
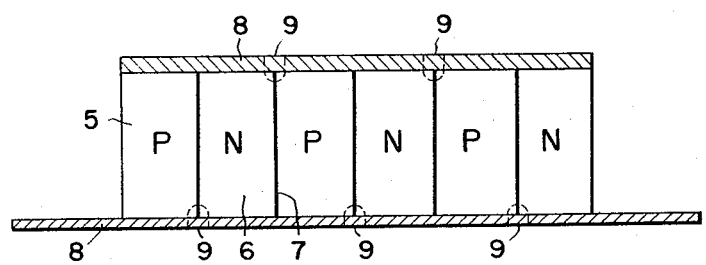
FIG. 3 is a side view of a further embodiment of this invention.

The following is another example of the invention. As shown in FIG. 3, p-type semiconductors 5, made by doping Pb in $Bi_2Te_3$, and n-type semiconductors 6, produced by doping Ag and Br in $Bi_2Te_3$, are bonded successively, e.g. by an epoxy resin such as "Araldite" (Reg. Trademark), and then the upper and lower surfaces of the above group of the elements are welded with aluminum plates 8, thus producing a thermoplastic device. The desired surface portion on said aluminum plate (reference numeral 9 in FIG. 3) is worked by an electron-beam in the machining device. At this time, the cut-away portion, its depth, its width, its progress of machining, etc., can accurately be controlled by determining the characteristic X-ray of the material machined. For example, as the characteristic X-ray of Pb is emitted from 5, and that of Ag and Br from 6, the semiconductors 5 and 6 can easily be distinguished by determining such characteristic X-rays as mentioned above with the help of an X-ray spectroscope arranged in the vicinity of the work pieces.

The above-mentioned description relates to an embodiment for the production of a switching transistor, but the method of this invention can effectively be utilized to remove a given part from a plated surface. Furthermore, the method according to the invention can be applied to machining of microcircuit elements or micro-modules.

Although this invention has been described with respect to a particular embodiment thereof, it is not to be so limited as changes and modifications may be made therein which are within the full intended scope of the invention, as defined by the appended claims.

What is claimed is:

1. A method of machining a specimen having a plurality of layers of different compositions which comprises: projecting a high energy electron beam of variable intensity to a specified part of one layer of the specimen to be machined for cutting through at least said one layer to an underlying chemically different layer; detecting the wave length of a characteristic X-ray emitted from the part; and controlling the intensity of said electron beam in accordance with a detection of a change in the wave length of said characteristic X-ray.

2. The method as defined in claim 1, wherein said specimen is a semiconductor body.

3. The method as defined in claim 2, wherein said semiconductor body has a p-type impurity and an n-type impurity and at least one pn junction.

4. A method of machining a semiconductor body having a p-conductivity type layer and an n-conductivity type layer provided therebetween with a pn junction, which comprises: projecting a high energy electron beam of variable intensity to a specified part of one layer of the specimen to be machined for cutting at least said one layer to an underlying layer; detecting the wave length of a characteristic X-ray emitted from the part; and controlling the intensity of said electron beam in accordance with a detection of a change in the wave length of said characteristic X-ray.

References Cited

UNITED STATES PATENTS

| | | | |
|---|---|---|---|
| 2,944,172 | 7/1960 | Opitz et al. | 219—121 X |
| 3,164,347 | 8/1964 | Ziegler | 250—49.5 |
| 3,209,433 | 10/1965 | Meyer et al. | 29—155.5 |
| 3,231,965 | 2/1966 | Roes | 29—155.5 |
| 3,237,281 | 3/1966 | Antonson | 29—155.5 |

FOREIGN PATENTS 626,571    8/1961    Canada.

RICHARD M. WOOD, *Primary Examiner.*

R. F. STAUBLY, *Assistant Examiner.*